United States Patent
Hofmann et al.

(10) Patent No.: US 9,266,257 B2
(45) Date of Patent: Feb. 23, 2016

(54) METHOD FOR REMOVING IMPURITIES FROM SHREDDED PLASTIC

(75) Inventors: Michael Hofmann, Hamburg (DE); Alexander Gercke, Bad Oldesloe (DE); Carsten Wermter, Hamburg (DE)

(73) Assignee: CVP Clean Value Plastics GmbH, Hamburg (DE)

(*) Notice: Subject to any disclaimer, the term of this patent is extended or adjusted under 35 U.S.C. 154(b) by 97 days.

(21) Appl. No.: 14/234,001

(22) PCT Filed: Jul. 13, 2012

(86) PCT No.: PCT/EP2012/002943
§ 371 (c)(1),
(2), (4) Date: Feb. 27, 2014

(87) PCT Pub. No.: WO2013/010653
PCT Pub. Date: Jan. 24, 2013

(65) Prior Publication Data
US 2015/0027498 A1   Jan. 29, 2015

(30) Foreign Application Priority Data
Jul. 21, 2011 (DE) .......................... 10 2011 108 161

(51) Int. Cl.
*B08B 7/00* (2006.01)
*B29B 17/02* (2006.01)
(Continued)

(52) U.S. Cl.
CPC ............ *B29B 17/02* (2013.01); *B29B 17/0412* (2013.01); *B08B 1/005* (2013.01); *B08B 3/00* (2013.01); *B08B 3/02* (2013.01); *B08B 3/04* (2013.01); *B29B 2017/0289* (2013.01); *B29B 2017/0484* (2013.01); *B29K 2067/003* (2013.01);
(Continued)

(58) Field of Classification Search
CPC ............ B29B 17/02; B29B 2017/0289; B29L 2007/008; B08B 1/005; B08B 3/00; B08B 3/02; B08B 3/04
See application file for complete search history.

(56) References Cited

U.S. PATENT DOCUMENTS 5,123,993 A * 6/1992 Wiggins .................. 156/750
6,238,267 B1   5/2001 Rouse
(Continued)

FOREIGN PATENT DOCUMENTS

CN   10115113     3/2008
CN   101481887    7/2009
(Continued)

*Primary Examiner* — Bibi Carrillo
(74) *Attorney, Agent, or Firm* — Vidas, Arrett & Steinkraus, P.A.

(57) ABSTRACT

A method for removing impurities from shredded plastic uses a device having a first and second cleaning disc with a first and second cleaning surface respectively. The cleaning surfaces lie opposite each other and border a cleaning gap between each other. The cleaning discs are rotated and liquid is fed into the cleaning gap. Shredded plastic is fed between the cleaning discs and conveyed through the cleaning gap, and the shredded plastic is processed abrasively by the cleaning surfaces. The temperature difference of the liquid guided through the cleaning gap during entry into the cleaning gap and the temperature of the liquid as it exits the cleaning gap and/or at least one parameter characterizing this temperature difference is measured. The distance between the cleaning surfaces is set such that the measured temperature difference and/or the at least one parameter characterizing this temperature difference achieve a setpoint value.

13 Claims, 3 Drawing Sheets

(51) Int. Cl.
  *B29B 17/04*   (2006.01)
  *B08B 1/00*    (2006.01)
  *B08B 3/02*    (2006.01)
  *B08B 3/00*    (2006.01)
  *B08B 3/04*    (2006.01)
  *B29K 67/00*   (2006.01)
  *B29L 7/00*    (2006.01)

(52) U.S. Cl.
  CPC ......... *B29L 2007/008* (2013.01); *Y02W 30/622* (2015.05); *Y02W 30/625* (2015.05)

(56) References Cited

U.S. PATENT DOCUMENTS 7,757,974 B2   7/2010   Hofmann et al.
8,328,124 B2   12/2012  Gingras

FOREIGN PATENT DOCUMENTS

| DE | 1218869 | 6/1966 |
| DE | 10 2004 024 791 A1 | 12/2005 |
| JP | 2005-96270 | 4/2005 |
| WO | 2008/058750 A2 | 5/2008 |

* cited by examiner

METHOD FOR REMOVING IMPURITIES FROM SHREDDED PLASTIC

CROSS-REFERENCE TO RELATED APPLICATIONS

This is a national stage application of PCT/EP2012/002943, Filed on Jul. 13, 2012, claiming priority to DE 10 2011 108 161.9 filed Jul. 21, 2011.

STATEMENT REGARDING FEDERALLY SPONSORED RESEARCH

Not applicable.

BACKGROUND OF THE INVENTION

The invention relates to a method for removing impurities from shredded plastic using a device, which comprises a first cleaning disc with a first cleaning surface and a second cleaning disc with a second cleaning surface, wherein the cleaning surfaces lie opposite each other and border a cleaning gap between each other.

Plastic refuse, for example PET beverage bottles, blister packaging made of PET (deep-drawn PET films), plastic refuse made of polyolefins or the like, must be cleaned in the course of recycling. Very high quality requirements must thereby be fulfilled. Permissible impurities lie in the ppm range. For the cleaning, plastic refuse is first milled into shredded plastic, in particular plastic flakes. Optimally milled shredded plastic is a prerequisite for the cleaning process and continuous infeed into a cleaning system. In particular, the shredded plastic should be created as evenly as possible with few fine particles. It is known to use a shredder (rotor with knives and counter knives and screen basket) for this. The generated flake size is impacted by the hole diameter in the screen basket. The separation of metals from the plastic refuse takes place in a pre-sorting by means of a magnet and eddy current separator. The state of the art is that a sorting by colour and/or plastic type takes place before the milling of the plastic refuse. However, due to the contamination of the plastic refuse, this has its limitations since the detection rate is lower for dirty materials than for clean ones. Furthermore, several washing lanes must then be operated during sorting before cleaning in order to clean the individual fractions. However, it is also possible to first pre-mill plastic refuse of different colours and/or different plastic types, then clean and to only perform the sorting by colour and/or plastic type at the end of the process by means of colour detection or respectively NIR, laser or X-ray spectroscopy. This can take place in a direct-light process and/or a transmitted-light process with suitable optical detector device (camera).

During the recycling of plastic flakes, in particular PET flakes, the following requirements must be met:
1. Removal of film and cellulose labels
2. Removal of the cellulose
3. Cleaning of the flakes of contaminants from contents (for example beverage residue)
4. Cleaning of the flakes of sticking contaminants (for example adhesives from labels)
5. Removal of metals (for example tin foil and aluminum cans)
6. Removal of foreign plastics
7. Sorting by colour (e.g. clear PET and coloured PET)

Similar requirements (but with higher threshold values) apply to the mechanical recycling of plastics. However, sorting by colour is generally omitted.

A method for the removal of cellulose and other sticking substances during recycling of refuse plastic, in particular mixed plastic, is known from WO 2008/058750 A2. A chopper disc mill can be used, the discs of which have interlocking teeth that are arranged spaced on concentric circles. Between the teeth of a circle, the holes are large enough for pieces of thicker or firmer material to pass through freely. A disc mill is also known from DE 10 2005 013 693 A1.

In the cleaning process according to the state of the art, high heating output is required to achieve sufficient cleaning of the shredded plastic. Heating outputs of 800 kW are partially required for this. This is a considerable expenditure of energy. Moreover, the control of the process temperature via a separate heating device is complex in terms of construction and feedback control.

BRIEF SUMMARY OF THE INVENTION

Starting from the explained state of the art, an object of the invention is to provide a method of the initially named type, with which the process temperature in the cleaning gap can be set to a desired value in a simple and energy-saving manner.

The invention solves this object through a method of the initially named type comprising the steps:
- at least one of the cleaning discs is rotated around its rotational axis,
- liquid, in particular water or an aqueous solution, is fed into the cleaning gap,
- shredded plastic to be cleaned is fed between the cleaning discs and conveyed through the cleaning gap, wherein the surfaces of the shredded plastic are processed abrasively by the first and second cleaning surface,
- the temperature difference between the temperature of the liquid guided through the cleaning gap during entry into the cleaning gap and the temperature of the liquid guided through the cleaning gap during exit from the cleaning gap and/or at least one parameter characterizing this temperature difference is measured,
- the distance between the cleaning surfaces is set such that the measured temperature difference and/or the parameter at least characterizing this temperature difference comes as close as possible to a setpoint value.

As initially explained, the method serves to clean shredded plastic. As also initially explained, the shredded plastic accumulates during the milling of plastic refuse, for example plastic packaging like beverage bottles or the like. The shredded plastic is pre-milled, planar plastic refuse, which can be available in the form of flakes (thin-walled hard plastics, films, etc.) or in the form of fragmented plastics (thick-walled hard plastics) with a mainly defined size. As also initially explained, the impurities to be removed can be in particular surface adherents, for example cellulose residues, adhesive residues, label residues or organic contaminants. The shredded plastic is in particular planar plastic particles. In particular in the case of plastic with a low viscosity, for example HDPE, thicker plastic particles that are cleaned with the method according to the invention can also be included up to a certain ratio.

In the case of the method according to the invention, a device is used that has a first and second cleaning disc. The first and second cleaning discs can each have a (hollow) cylindrical basic shape. The opposite-lying cleaning surfaces can each have an annular shape. The cleaning discs can be arranged above each other so that each of the cleaning surfaces lies in a horizontal plane. The rotational axis of the at least one rotatingly driven cleaning surface can simultaneously be its symmetrical axis. The rotational axis can progress in the vertical direction. The drive can be an electrical drive. The shredded plastic can be inserted centrally between the cleaning discs. They can then be conveyed through the cleaning gap from inside to outside, thereby cleaned and then extracted outside out of the cleaning gap.

The invention is based on the knowledge that the temperature of the liquid directed through the cleaning gap and thus the process temperature can be set in a simple manner via the targeted generation of friction in the cleaning gap and in particular a targeted abrasive processing of the shredded plastic. In particular, sufficient heat is created through the friction generated during the method according to the invention in the course of the abrasion in order to set the liquid to the desired process temperature. Through a sufficient increase in friction, the required process liquid temperature can be set without additional heating of the liquid loop. In addition to the geometry of the cleaning discs and in particular their cleaning surfaces, the friction can be set in particular via the distance between the cleaning discs. The smaller this distance, the more friction and abrasion and thus also lost heat is generated, which is received by the process liquid. Accordingly, the difference in the temperature of the liquid directed through the cleaning gap between the inlet into the cleaning gap and the outlet out of the cleaning gap and/or at least one parameter characterizing this temperature difference is measured according to the invention in particular multiple times during the performance of the method, for example continuously during the performance of the method. A suitable control device compares the measured values with a setpoint value for the temperature difference. If an impermissible deviation is hereby determined, the control device controls an adjustment device, which changes the distance between the cleaning discs and thus the thickness of the cleaning gap, in order to adjust the measured values as exactly as possible to the respectively specified setpoint value. In the case of the invention, a hydrodynamic process is generated. A targeted abrasion and thus cleaning of the shredded plastic are thereby possible without requiring the addition of added chemicals, like sodium hydroxide, to the cleaning gap.

In the case of the method according to the invention, a suspension is generated, the ingredients of which are the supplied liquid, for example water, the cleaned shredded plastic and substances rubbed off it (for example adhesives, cellulose, labels, organic contaminants, etc.). After the cleaning, a separation of the suspension with the impurities from the cleaned shredded plastic takes place.

According to the invention, the liquid supply serves to convey the shredded plastic through the cleaning gap and to discharge rubbed-off parts created in the course of the cleaning process. This results in turbulences in the water flow, which in turn leads to very high liquid flow speeds through the cleaning gap. This results in a strong pressing of the shredded plastic to be cleaned against the cleaning surfaces. The cleaning of the shredded plastic is hereby improved. In the case of the method according to the invention, a minimum solids concentration (ratio of solids quantity, in particular shredded plastic quantity, to liquid quantity) is not specified. Low solids concentrations are also conceivable according to the invention. In particular, solids concentrations of less than 10% can be used. The maximum solids concentration depends on the degree of contamination or respectively the maximum processing capacity of the used cleaned disc. The maximum solids concentration can be increased by using larger cleaning discs. The used liquid quantity is adjusted for the degree of contamination of the shredded plastic to be cleaned and the heat generated in the process.

In the case of the method according to the invention, it can be provided in that particular that the shredded plastic is not milled in the course of the abrasive processing in the cleaning gap. The cleaning effect is hereby improved. A tangential friction or respectively shear friction takes place, which enables sufficient heat generation for the desired process temperature and thus also a satisfactory cleaning of the shredded plastic. In that milling is avoided, a loss of process heat due to deformation work performed on the shredded plastic is mainly avoided. The introduced energy is rather mainly converted into heat. In order to achieve abrasion but no milling, the cleaning gap is set to just such a thickness that fulfils this requirement. As already explained, it can be provided that the liquid directed through the cleaning gap is not heated by a separate heating device. Rather, the heating can be provided solely by the generated friction. It can even be required to cool the liquid directed through the cleaning gap using a cooling device if the friction required for the cleaning generates too much heat. It is thereby also possible to divert heat generated in the course of the process but that is not needed and to use it for other processes, for example for heating buildings or for power generation. For example, unneeded heat can be diverted from the process by means of a heat exchanger and used for other purposes.

The cleaning surfaces of the cleaning discs of the device used in the device used according to the invention can each have a plurality of cleaning ribs extending between an inner and an outer edge of the cleaning surfaces, wherein at least one flank of the cleaning ribs is tilted or bent with respect to the axial direction of the respective cleaning disc and several cleaning bar progressing diagonally to the extension direction of the cleaning ribs are arranged between at least a few neighbouring cleaning ribs.

The cleaning discs of the device thus have cleaning ribs, which progress between the inner and the outer edge of the cleaning surfaces or respectively the cleanings discs.

The ribs can be designed in particular in a continuous manner, i.e. without interruptions in their extension directions. If the cleaning surfaces or respectively cleaning discs are closed in the area of their centre, the cleaning ribs progress between the centre and an outer edge of the cleaning surfaces or respectively cleaning discs. The cleaning ribs can have a straight progression or they can be bent. Furthermore, they can progress in the radial direction over the respective cleaning surface. However, it is also possible that they are tilted or bent with respect to the radial direction. According to the invention, at least one of the flanks of the cleaning ribs is bent or tilted with respect to the symmetrical axis or respectively rotational axis of the respective cleaning disc. The corresponding flanks can thus each lie in a level or in a bent plane. As explained, the axes of the cleaning discs can each progress in the vertical direction. It is thereby also possible that both flanks of the cleaning ribs are bent or tilted with respect to the symmetrical axis of the respective cleaning disc. Furthermore, according to the invention, cleaning bars are arranged between at least some, in particular all, cleaning ribs progressing next to each other. They progress diagonally to the extension direction of the cleaning ribs. They can progress perpendicular to the extension direction of the cleaning ribs. But they can also progress in a direction diagonal to the extension direction of the cleaning ribs, which has a smaller or greater angle than 90° to the extension direction of the cleaning ribs.

During the processing of shredded plastic, in particular plastic flakes, it is decisive that the cleaning of the shredded plastic takes place without a strong mechanical wear or respectively deformation (compression). Better cleaning of the shredded plastic is achieved through the reduction of the mechanical wear from compression. In particular, a folding or balling of the shredded plastic is avoided. The surfaces of the shredded plastic with the impurities thus remain accessible for the cleaning. Moreover, smooth shredded plastic has a higher bulk density and does not tend to be serrated so that its ability to be conveyed is improved. Moreover, smooth shredded plastic is easier to sort, in particular in sorting devices, in which the shredded plastic falls from top to bottom due to gravity. Thus, in the case of smooth shredded plastic, a uniform "shredded plastic curtain" forms. Finally, through the reduction in mechanical wear, the generation of fine particles is avoided. At the same time, more heat is available for providing the desired process temperature.

It has been shown that the geometry of the cleaning discs according to the invention, in particular the tilt or respectively bend of at least one of the flanks of the cleaning ribs, leads to such lower mechanical wear. In the case of the geometry of the cleaning discs according to the invention, the shredded plastic is pulled between the discs, in particular between the cleaning ribs. A buckling or folding or balling of the shredded plastic is avoided. Thus, there is ideally a single-particle layer of shredded plastic between the cleaning discs so that it can be optimally cleaned of the surface impurities. The surface of the cleaning ribs thereby generates the required friction for cleaning the shredded plastic. In particular, the shredded plastic in the case of the cleaning disc geometry according to the invention is mainly completely abraded, wherein all sticking contaminants are removed. The addition of chemicals, for example sodium hydroxide, as is often required for the cleaning in the state of the art, is not required according to the invention. Rather, the geometry of the cleaning discs or respectively the cleaning surfaces according to the invention leads to sufficient cleaning of the shredded plastic without leading to or needing to lead to a milling of the shredded plastic.

Furthermore, in the case of the geometry according to the invention, a slight stretching of the shredded plastic takes places so that it is pulled smooth and, if necessary, folded shredded plastic (for example from a pre-milling) is folded open again. It was shown in particular that the main part of the friction for polishing and thus cleaning the shredded plastic takes place in the area of the sloped or respectively bent flanks of the cleaning ribs. As mentioned, the corresponding flank does not necessarily have to lie in a planar plane. Rather, there can be a bent flank so that a soft transition to the apex area is achieved. It is important that a sufficiently large friction surface of the cleaning ribs is present so that a sufficient cleaning affect is created. The cleaning bars arranged in the channels between the cleaning ribs according to the invention act as barriers and force the shredded plastic between the cleaning discs, in particular between the cleaning ribs of the cleaning discs.

In addition to cleaning, the targeted abrasion of the shredded plastic achieved according to the invention has another additional advantageous effect. The shredded plastic is thus provided with a matte surface, which reflects light less strongly. This facilitates an optical sorting of the shredded plastic after the cleaning process. Specifically in the case of optical sorting devices, which detect colour after the direct-light process, a very shiny and thus reflective surface is disadvantageous. A better detection of the shredded plastic is thus achieved through the abrasion of the shredded plastic according to the invention.

According to one embodiment, the tilted or bent flanks of the cleaning ribs of the first and/or second cleaning disc can be the front-running flanks during a rotation of the at least one cleaning disc. In the case of the non-rotatingly driven cleaning disc, the front-running flank of the cleaning ribs is the front-running flank in the course of the relative rotation between the cleaning discs. Through this embodiment, the abrasion of the shredded plastic according to the invention and thus the cleaning according to the invention is performed in a particularly effective manner.

The degree of the tilt or respectively bend of the flanks according to the invention depends decisively on the type of plastic to be cleaned, the shape of the shredded plastic and the size distribution within the shredded plastic quantity to be cleaned. It is also decisive that a milling or respectively compression of the shredded plastic does not happen if at all possible. At the same time, the shredded plastic must be subjected to sufficient friction for the cleaning. There must thus be sufficient space for receiving the shredded plastic to be cleaned between the facing flanks of neighbouring cleaning ribs. In the case of flat shredded plastic, flanks with a large tilt angle or respectively bend angle with respect to the axial direction are thereby suitable. In particular, the shredded plastic in the case of a gently rising flank is pulled particularly well between the cleaning discs.

Moreover, there is a large abrasion surface so that a particularly good cleaning effect is achieved. On the other hand, in the case of lumpy shredded plastic, a smaller tilt angle or respectively bend angle with respect to the axial direction is suitable. It is for example possible that the tilted flanks of the cleaning ribs of the first and/or second cleaning disc each have a tilt angle of at least $10°$, preferably at least 30%, even more preferably at least $45°$, with respect to the axial direction of the respective cleaning disc. If the flanks of the cleaning ribs are bent, it can be provided that, seen in a sectional plane perpendicular to the extension direction of the cleaning ribs of the first and/or second cleaning disc, a line connecting the start and the end of the bent flanks has a tilt angle of at least $10°$, preferably at least 30%, even more preferably at least $45°$, with respect to the axial direction of the respective cleaning disc. Upper limits for the named angle can be for example at least $45°$, preferably at least $60°$, even more preferably at least $80°$.

According to a further embodiment, it can be provided that, in the case of the device used according to the invention, there is a distance between the apex areas of the cleaning ribs of the first cleaning surface and the apex areas of the cleaning ribs of the second cleaning surface, which mainly corresponds with the average thickness of the shredded plastic fed by means of the feeding device, in particular the main particle class. The distance between the cleaning discs and thus the thickness of the cleaning gap are thus adjusted for the thickness of the average shredded plastic to be expected.

The distance between the discs should be set to the greatest extent possible so that only individual pieces of shredded plastic fit between the discs. This achieves an optimal cleaning through abrasion of the top and bottom sides of the shredded plastic. For this, it is in turn advantageous if the shredded plastic to be cleaned has the smallest possible thickness distribution. If there is a thickness distribution, the height of the cleaning bars can be selected such that the distance between the opposite cleaning bars corresponds with the average thickness of the thickest shredded plastic during operation of the cleaning discs. The reaching of the respectively optimal threshold thickness of the cleaning gap can be determined on the power consumption of the drive device. If the threshold thickness is fallen short of, there is an erratic increase in power consumption. An example for the processing of PET bottles from single-use systems is a cleaning gap of 0.25 mm, for the processing of returnable PET bottles (thicker wall), a cleaning gap of 0.50 mm and for the processing of film shavings, a cleaning gap of 0.1 mm. The respectively suitable distance must be determined and adjusted depending on the material.

According to a further embodiment, in the case of the device used according to the invention, the cleaning ribs of the first and/or the second cleaning disc can form a saw tooth profile in a circumferential direction around the centre of the respective cleaning disc or the respective cleaning surface (respectively). The cleaning ribs can form a saw tooth profile in cross-section in the circumferential direction, i.e. for example along one or more annular or alternative paths with different radii around the centre of the cleaning disc or respectively the cleaning surface. Thus, they can merge directly into each other as seen in the circumferential direction. (Horizontal) bottom areas between neighbouring cleaning ribs, in which shredded plastic could collect in an undesirable manner, are hereby avoided.

According to a further embodiment, the cleaning ribs of the first and/or second cleaning disc can be rounded at least in the transition between their at least one tilted or bent flank and their apex area. Furthermore, the cleaning ribs of the first and/or second cleaning disc can have a horizontal apex area. Of course, the cleaning ribs can also be rounded in the transition to an, if applicable, non-tilted or non-bent second flank. A curling up of the shredded plastic is avoided in that there is no sharp edge, in particular a sharp ridge, on the transition between the flank and the apex area. Rather, the rounding and the horizontal apex area ensure that the shredded plastic is pulled between the cleaning discs in the unfolded, flat state and cleaned there.

The cleaning bars of the first and/or second cleaning disc can each rise in a sloped manner in the radial direction of the cleaning discs, that is in particular from inside to outside. This embodiment leads to a particularly effective pulling in of the shredded plastic in the processing area between the cleaning discs. According to a further embodiment, the cleaning bars of the first cleaning disc can have a smaller height than the cleaning ribs of the first cleaning disc and/or the cleaning ribs of the second cleaning disc can have a smaller height than the cleaning ribs of the second cleaning disc. In the case of this embodiment, the shredded plastic works in a gentler manner between the cleaning discs since all shavings are not forced between the discs at each cleaning bar. In particular, flakes that have a greater wall thickness that the cleaning gap between the cleaning ribs can glide through the resulting hole without being pulverized by the cleaning ribs.

Generally, the first and/or second cleaning disc can be designed as a single piece or can be made up of several cleaning disc segments. According to a further embodiment, the cleaning bars of the first and second cleaning disc can be arranged so that they do not end up or at least not permanently in directly opposite-lying positions during a rotation of the at least one cleaning disc. Furthermore, the cleaning bars on the first and second cleaning surface can each be arranged along several annular paths around the centre of the respective cleaning disc or the respective cleaning surface. The annular paths of the cleaning bars on the first cleaning surface can thereby have different radii than the annular paths of the cleaning bars on the second cleaning surface. Furthermore, it can be provided that the cleaning bars along the annular path are each arranged between each pair of neighbouring cleaning ribs. The annular paths on a cleaning are in particular concentric to each other. The centre of the cleaning surface can be identical to the centre of the cleaning disc. As explained, the cleaning surface can be for example annular, while the cleaning disc can be for example (hollow) cylindrical. Different radii of the annular paths on the first and second cleaning disc ensure that the cleaning bars do not lie directly opposite each other in the course of the relative rotation of the cleaning discs. The mechanical wear of the shredded plastic is hereby reduced. The cleaning discs can thus be designed differently with respect to each other. They can each have a circular path with cleaning bars with an identical radius lying directly opposite on their outer and/or their inner edge.

Alternatively, it is also possible that the cleaning surfaces of the upper and lower cleaning disc are designed identical to each other. At least some of the annular paths on the first cleaning surface and some of the annular paths on the second cleaning surface can thereby have the same radius, wherein at least the cleaning bars along annular paths with the same radius are each only arranged between each second pair of neighbouring cleaning ribs. In particular, all of the annular paths on the first cleaning surface and of the annular paths on the second cleaning surface can thereby have the same radius and, furthermore in particular, the cleaning ribs along annular paths with the same radius are each arranged only between each second pair of neighbouring cleaning ribs. An alternating arrangement is thus hereby provided, wherein the cleaning bars are only provided in every second channel between neighbouring cleaning ribs. The relative rotation of the cleaning discs towards each other thus causes the cleaning bars to lie directly opposite each other during 50% of the processing time. While this embodiment has advantages with respect to the production costs of the cleaning discs, it does lead to higher wear on the shredded plastic. Nevertheless, it is well suited in particular for very thin shredded plastic (plastic film shreds).

According to a further embodiment, it can be provided that shredded plastic to be cleaned undergoes a pre-cleaning in a pre-cleaning device before being fed between the cleaning discs and conveyed through the cleaning gap of the device actually provided for the removal of impurities. The pre-cleaning device thereby has a first cleaning disc with a first cleaning surface and a second cleaning disc with a second cleaning surface, wherein the cleaning surfaces lie opposite each other and border a cleaning gap between each other, which is greater than the cleaning gap of the device subsequently used to remove impurities from the shredded plastic. As in the main cleaning following the pre-cleaning, at least one of the cleaning discs can thereby be turned around its rotational axis; liquid, in particular water or an aqueous solution, can be fed into the cleaning gap of the pre-cleaning device; and the shredded plastic to be cleaned can be fed between the cleaning discs of the pre-cleaning device and conveyed through the cleaning gap. A two-step cleaning process thus takes place.

In principle, the pre-cleaning device can be designed mainly identically to the subsequently used main cleaning device. However, it can be dimensioned smaller. In that the cleaning gap of the pre-cleaning device is larger than that of the main cleaning device, it can be achieved that only a small amount or mainly no abrasive processing of the shredded plastic takes place. In particular, it can be provided that the cleaning gap of the pre-cleaning device is selected through the adjustment of the distance between the cleaning discs such that impurities removed in the course of the pre-cleaning of the shredded plastic, for example removed cellulose, are mainly not destroyed. This considerably facilitates the subsequent cleaning of the shredded plastic in the main cleaning device. It is thereby also possible in the pre-cleaning device to perform a regulation according to the invention of the cleaning gap based on a temperature measurement.

It is also possible that shredded plastic to be cleaned undergoes a pre-cleaning in a pre-cleaning device before being fed between the cleaning discs and conveyed through the cleaning gap, wherein the pre-cleaning device comprises a hollow cleaning cylinder with a first cleaning surface on its cylindrical inner surface and a cleaning cylinder arranged in the hollow cleaning cylinder with a second cleaning surface on its cylindrical outer surface, wherein the cleaning surfaces border a cleaning gap between each other, which is greater than the cleaning gap of the device subsequently used to remove impurities on the shredded plastic. The hollow cleaning cylinder and/or the cleaning cylinder are thereby driven in a rotating manner. The cleaning gap of the pre-cleaning device can then in turn be selected by adjusting the distance between the hollow cleaning cylinder and the cleaning cylinder such that impurities removed from the shredded plastic in the course of the pre-cleaning are mainly not destroyed.

Finally, it is also possible that shredded plastic to be cleaned undergoes a pre-cleaning in a pre-cleaning device before being fed between the cleaning discs and conveyed through the cleaning gap, wherein the pre-cleaning device comprises a hollow cleaning cone with a first cleaning surface on its conical inner surface and a cleaning cone arranged in the hollow cleaning cone with a second cleaning surface on its conical outer surface, wherein the cleaning surfaces border a cleaning gap between each other, which is greater than the cleaning gap of the device subsequently used to remove impurities on the shredded plastic. The hollow cleaning cone and/or the cleaning cone are thereby driven in a rotating manner. The cleaning gap of the pre-cleaning device can then in turn be selected by adjusting the distance between the hollow cleaning cone and the cleaning cone such that impurities removed from the shredded plastic in the course of the pre-cleaning are mainly not destroyed.

In the case of all of the aforementioned three alternative embodiments, it can be ensured in particular that impurities, like cellulose, removed from the shredded plastic in the course of the pre-cleaning are mainly not destroyed, that is are available as an intact structure (e.g. cellulose fibres). They can then be easily removed from the process liquid, in particular the process water, by means of filtration and/or sifting. In contrast, if impurities are destroyed too much (e.g. if cellulose fibres are ground up too much), they can only be removed using complex process water cleaning methods.

An exemplary embodiment of the invention is explained in greater detail below using figures. The figures show schematically:

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
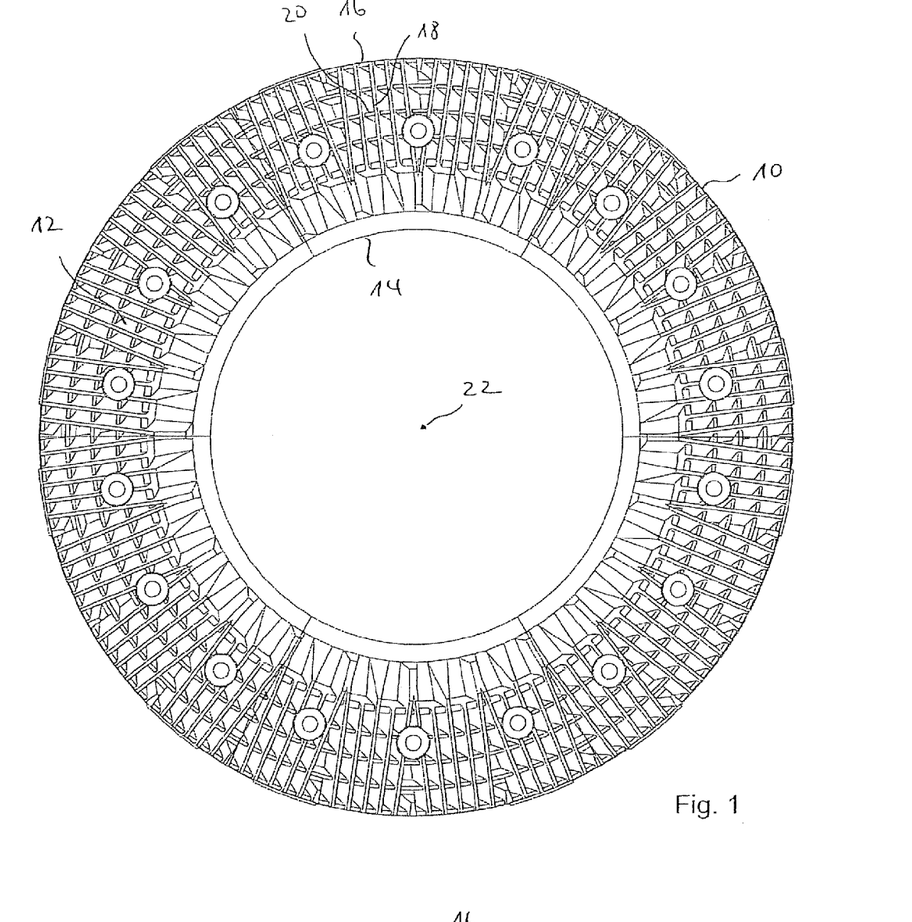
FIG. 1 a cleaning disc of a device used in the method according to the invention in a view from the top, FIG. 2 an enlarged section of the cleaning disc from FIG. 1 in a view from the top, FIG. 3 an enlarged section of the cleaning disc from FIG. 1 in a perspective view, FIG. 4 a section of a first and a second cleaning disc of a device used in the method according to the invention in a perspective view, FIG. 5 a part of a sectional view of the cleaning disc from FIG. 1 in the radial direction, FIG. 6 a part of a sectional view in a circumferential direction around the centre of the cleaning discs in FIG. 4, FIG. 7 the view from FIG. 6 in a first operating state, FIG. 8 the view from FIG. 6 in a second operating state, and FIG. 9 the view from FIG. 6 in a third operating state.

If not specified otherwise, the same reference numbers are used for the same objects in the figures. FIG. 1 shows a lower cleaning disc 10 of a device used in the method according to the invention in a view from the top. The cleaning disc 10 has a hollow cylindrical basic shape and an annular cleaning surface 12. In the example shown, the cleaning disc 10 is made up of several cleaning disc segments. A plurality of cleaning ribs 18 extending between the inner edge 14 and the outer edge 16 of the cleaning surface is arranged on the cleaning surface 12. It can be seen that the cleaning ribs 18 of a cleaning disc segment are arranged mainly parallel to each other. Overall, the cleaning ribs 18 progress in the radial direction of the cleaning disc or at a small angle to the radial direction. In the shown example, several cleaning bars 20 extending diagonally to the extension direction of the cleaning ribs are arranged between all neighbouring cleaning ribs 18. The cleaning bars 20 are arranged along several—five in the shown example—concentric, annular paths around the centre of the cleaning disc 10 or respectively the cleaning surface 12. The structure of the cleaning ribs 18 and the cleaning bars 20 can be seen in FIG. 3. In particular, it can be seen in FIG. 3 that the cleaning ribs 18 each have a first flank 24 tilted with respect to the rotational axis of the cleaning disc 10 shown in FIG. 1 with reference number 22. The first flank 24 empties into a horizontal apex area 26. The horizontal apex area 26 in turn opens into a second flank 28 of the cleaning ribs 18, which lies in the shown example in a vertical plane, i.e. is not tilted with respect to the rotational axis 22 of the cleaning disc 10. Moreover, it can be seen in FIG. 3 that the cleaning bars 20 as seen in the radial direction each have a sloped, rising surface 30, which also empties into a horizontal apex area 32. The surface 34 of the cleaning bars lying opposite the surface 30 is in turn arranged in an almost vertical plane. Finally, it can be seen in FIG. 3 that the height of the cleaning bars 20, in particular its apex areas 32, is smaller than the height of the cleaning ribs 18, in particular their apex areas 26. Depending on the segment-like design of the cleaning disc 10, the cleaning ribs have in an alternating manner a start 36 gently rising starting from the inner edge 14 of the cleaning disc 10 or a steeply rising start 38.

Figure 2:
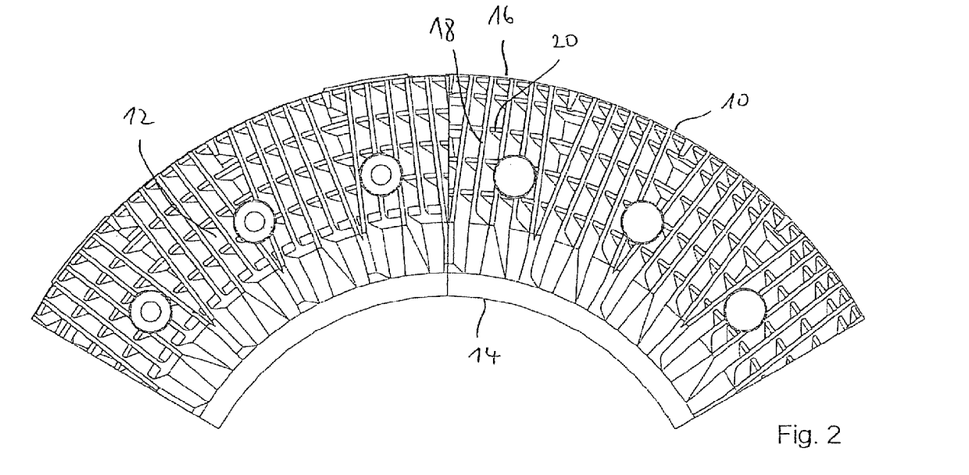
Figure 3:
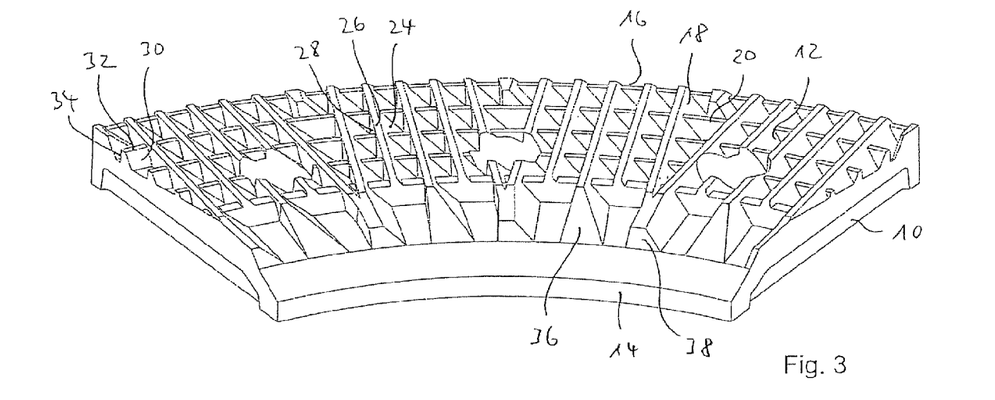
Figure 4:
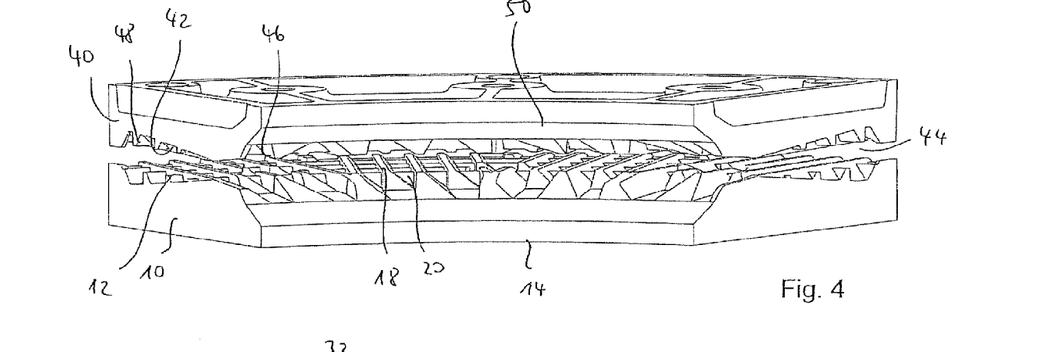

FIG. 4 shows the lower cleaning disc 10 shown in FIGS. 1 through 3 in sections in an operating position with an upper cleaning disc 40. The upper cleaning disc 40 mainly corresponds in its design with the design of the lower cleaning disc 10. Thus, the upper cleaning disc 40 is also designed with a hollow cylindrical basic shape and has an annular cleaning surface 42. Accordingly, a cleaning gap 42 is formed between the cleaning surfaces 12 and 42 of the lower and upper cleaning disc 10, 40. The cleaning surface 42 of the upper cleaning disc 40 is also designed largely identical to the cleaning surface 12 of the lower cleaning disc 10. In particular, the upper cleaning surface 42 also has cleaning ribs 46 designed identical to the cleaning ribs 18 of the lower cleaning disc 10. Moreover, the upper cleaning disc 10 also has several cleaning bars 48 between all neighbouring cleaning ribs 46, which are in turn arranged along several concentric circular paths around the centre of the upper cleaning disc 40. However, the radii of the concentric circular paths of the upper cleaning disc 40 differ from the radii of the concentric circular paths of the lower cleaning disc 10 so that in the case of a relative rotation between the cleaning discs 10, 40 during operation the cleaning bars 20, 48 do not get into a directly opposing position. A circular path with cleaning bars 20 or respectively 48 of the upper and lower cleaning disc 10 or respectively 40 is respectively provided on its outer edge, which lie directly opposite each other during operation and form the outer closure of the respective cleaning surfaces 12, 42. The device shown in FIG. 4 furthermore comprises a drive device (not shown), with which for example the upper cleaning disc 40 can be rotated around its rotational axis. Furthermore, the device comprises a plastic feeding device (also not shown), with which shredded plastic to be cleaned is fed centrally, that is via the inner edge 14 or respectively 50 of the cleaning discs 10, 40, into the cleaning gap 44. Finally, the device comprises a liquid feeding device (also not shown), with which in the shown example water is also directed centrally via the inner edge 14 or respectively 50 of the cleaning discs 10, 40 into the cleaning gap 44.

Figure 5:
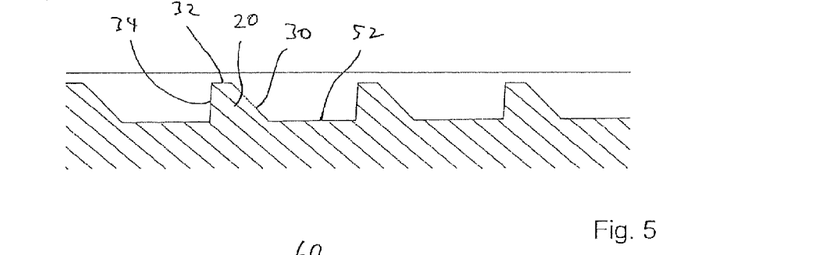

In the sectional view in the radial direction according to FIG. 5, the geometrical design of the cleaning bars 20 of the lower cleaning disc 10 in the shown example can be seen. In particular, the sloped, rising surface 30, the apex area 32 and the vertical surface 34 are thereby easy to see. It can also be seen that a horizontal bottom area 52 is designed respectively between cleaning bars 20 arranged behind each other in the radial direction. The cleaning bars 48 of the upper cleaning disc 40 are designed identically in this respect.

Figure 6:
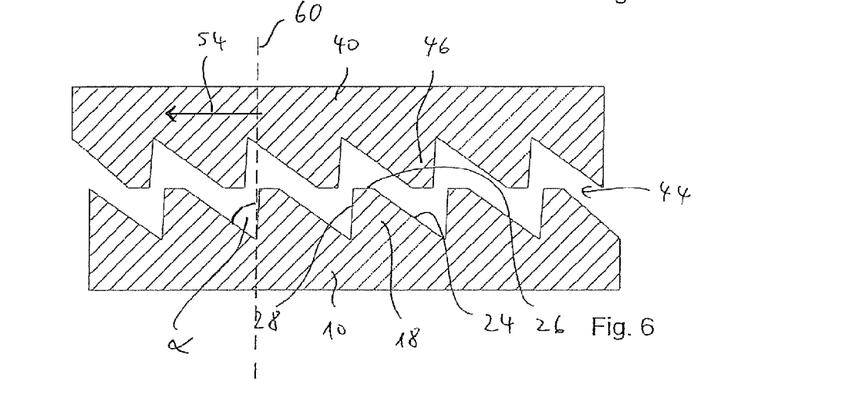

FIG. 6 shows a cut through the device from FIG. 4 in a circumferential direction around the rotational axis 22 of the cleaning disc 10 or respectively around the coaxially progressing rotational axis of the upper cleaning disc 40. The first flank 24 of the cleaning ribs 18 of the lower cleaning disc 10 tilted towards the rotational axes of the lower and upper clean disc 10, 40 can in turn be seen. Furthermore, each horizontal apex area 26 and the vertical second flank 28 of the cleaning ribs 18 of the lower cleaning disc 10 can be seen. It can also be seen in FIG. 6 that the cleaning ribs 18 are arranged directly behind each other so that they result in a saw tooth profile in the sectional view in FIG. 6. Finally, it can be seen that the cleaning ribs 46 of the upper cleaning disc 40 are designed identically to the cleaning ribs 18 of the lower cleaning disc 10. The rotational direction of the upper cleaning disc 40 in the course of rotation by the drive device is indicated in FIG. 6 by the arrow 54. It can be seen that the flanks of the cleaning ribs 18, 46 tilted with respect to the rotational axis of the upper or respectively lower cleaning disc 10, 40 are the respective front-running flanks in the case of a rotation of the upper cleaning disc 40. It should also be mentioned that the tilted flanks of the cleaning ribs 18, 46 each have an angle α to the axis direction of the cleaning discs 10, 40 of more than 45° shown in FIG. 6 by the reference number 60. A comparatively large abrasion surface is hereby available on the tilted flanks whereby the cleaning effect is improved. The axial direction 60 progresses parallel to the rotational axis 22 of the cleaning disc 10.

Figure 7:
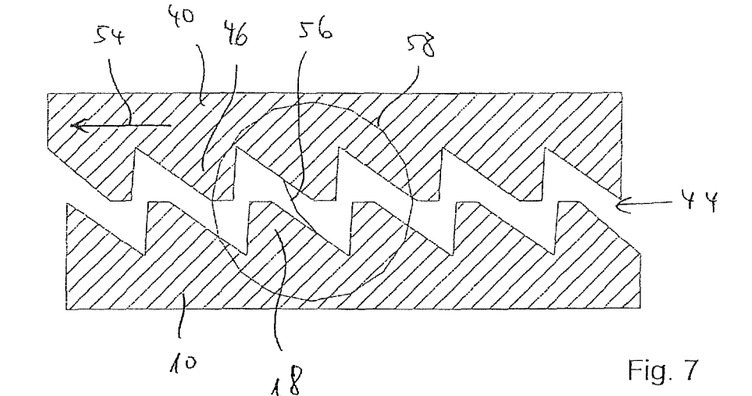
Figure 8:
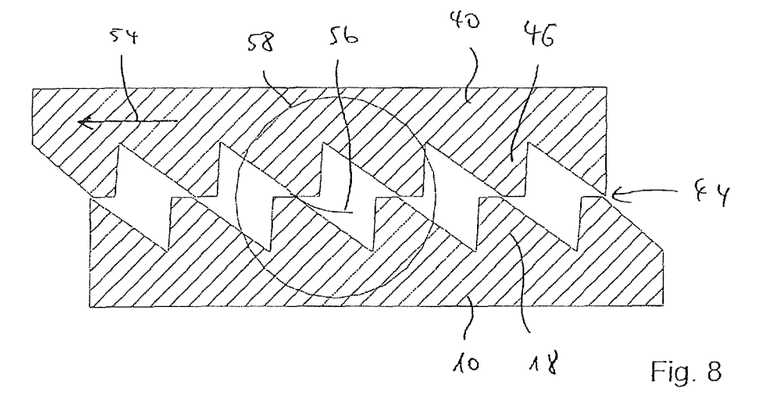
Figure 9:
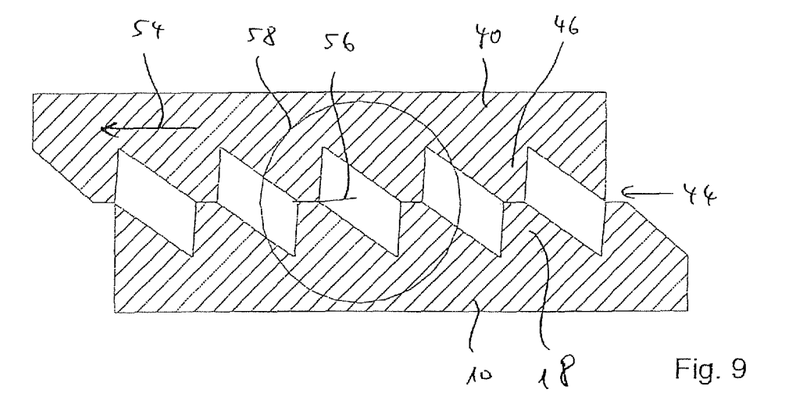

Based on the representation in FIG. 6, the cleaning of a piece of shredded plastic 56, in particular a plastic flake 56, is to be shown based on FIGS. 7 through 9. FIG. 7 shows the relative position of the cleaning discs 10, 40 with respect to each other, as it is shown in FIG. 6. The plastic flake 56 is located within the circle 58 shown in FIGS. 7 through 9 for illustrative purposes. In FIG. 7, the plastic flake 56 is located in a slightly buckled or respectively bent shape in a free space between opposite-lying cleaning ribs 18, 46. In the course of the rotational movement of the upper cleaning disc 40 along the arrow 54, the plastic flake 56 subsequently moves between the apex areas of the cleaning ribs 18, 48, as is shown in FIGS. 8 and 9. This leads to a stretching of the plastic flake 56 as well as an abrasive contact with the bent flanks and the apex surfaces of the participating cleaning ribs 18, 46. This in turn leads to a rubbing off of impurities adhering to the surfaces of the plastic flake 56. This effect is intensified by the very high flow speeds of the water directed through the cleaning gap 44 due to the geometry of the cleaning discs 10, 40.

In the case of the abrasive processing of the shredded plastic in the cleaning gap, considerable heat is generated, which is received by the water directed through the cleaning gap. According to the invention, a temperature measuring device (not shown in greater detail) is thus provided, with which the temperature difference between the entry of the water into the cleaning gap and the exit of the water out of the cleaning gap is continuously measured during the operation of the device for the water directed through the cleaning gap. Furthermore, a control device (also not shown) that compares the measurement values recorded by the temperature measuring device with a setpoint temperature difference is provided. If an impermissible deviation is hereby identified, the control device actuates a cleaning disc adjusting device (not shown), in order to reduce or increase the cleaning gap depending on the deviation between the measured temperature difference values and the temperature difference setpoint value, in that at least one of the cleaning discs is moved in the vertical direction relative to the other cleaning disc. Instead of a direct measurement of the temperature difference, a parameter characterizing this temperature difference can also be measured, which is then taken as the basis for the regulation in the explained manner. Such a characterizing parameter can be for example the power consumption of the drive for the rotation of the at least one cleaning disc. In this case, the difference between the power consumption of the drive in idle with liquid fed into the cleaning gap on one hand and the power consumption in the cleaning mode of the shredded plastic can be measured. A regulation of the process water temperature thus takes place solely through the adjustment of the friction and thus abrasive processing of the shredded plastic. If required, a cooling of the process water directed through the cleaning gap can thereby also take place. A suitable cooling device can be provided for this.

It can thereby also be provided that the shredded plastic to be cleaned undergoes a pre-cleaning in a pre-cleaning device (not shown) before being fed between the cleaning discs 10, 40 and conveyed through the cleaning gap 44 of the device actually provided for the removal of impurities as was explained above.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method for removing impurities from shredded plastic using a device, which comprises a first cleaning disc (10) with a first cleaning surface (12) and a second cleaning disc (40) with a second cleaning surface (42), wherein the cleaning surfaces (12, 42) lie opposite each other and border a cleaning gap (44) between each other, the method comprising the following steps:
    at least one of the cleaning discs (10, 40) is rotated around its rotational axis,
    liquid is fed into the cleaning gap (44),
    shredded plastic to be cleaned is fed between the cleaning discs (10, 40) and conveyed through the cleaning gap (44), wherein the surfaces of the shredded plastic are processed abrasively by the first and second cleaning surfaces (12, 42), a temperature difference between a temperature of the liquid guided through the cleaning gap (44) during entry into the cleaning gap (44) and a temperature of the liquid guided through the cleaning gap (44) during exit from the cleaning gap (44) and/or at least one parameter characterizing this temperature difference is measured, the measured temperature difference is compared to a setpoint value for the temperature difference and/or the measured parameter characterizing the temperature difference is compared with a setpoint value for the parameter characterizing the temperature difference, depending on a deviation between the measured temperature difference and the setpoint value for the temperature difference and/or between the measured parameter characterizing the temperature difference and the setpoint value for the parameter characterizing the temperature difference the cleaning gap is reduced or increased such that the measured temperature difference and/or the at least one parameter characterizing this temperature difference comes as close as possible to the respective setpoint value.

2. The method according to claim 1, wherein the shredded plastic is not milled in the course of abrasively processing in the cleaning gap (44).

3. The method according to claim 1, wherein the liquid directed through the cleaning gap (44) is heated, but not by a heating device.

4. The method according to claim 1, wherein the liquid directed through the cleaning gap (44) is cooled by a cooling device.

5. The method according to claim 1, wherein the cleaning disks have an axial direction and wherein the cleaning surfaces (12, 42) of the cleaning discs (10, 40) of the device each have a plurality of cleaning ribs (18, 46) extending between an inner and an outer edge of the cleaning surfaces, wherein at least one flank of the cleaning ribs (18, 46) is tilted or bent with respect to the axial direction of the respective cleaning disc (10, 40), and wherein a plurality of cleaning bars (20, 48) are provided between at least some of the neighbouring cleaning ribs (18, 46).

6. The method according to claim 1, wherein shredded plastic to be cleaned undergoes a pre-cleaning in a pre-cleaning device before being fed between the cleaning discs (10, 40) and conveyed through the cleaning gap (44) of the device, wherein the pre-cleaning device comprises a first cleaning disc with a first cleaning surface and a second cleaning disc with a second cleaning surface, wherein the cleaning surfaces lie opposite each other and border a cleaning gap between in each other, which is larger than the cleaning gap (44) of the device used subsequent to the removal of impurities on the shredded plastic.

7. The method according to claim 1, wherein shredded plastic to be cleaned undergoes a pre-cleaning in a pre-cleaning device before being fed between the cleaning discs (10, 40) and conveyed through the cleaning gap (44), wherein the pre-cleaning device comprises a hollow cleaning cylinder with a first cleaning surface on its cylindrical inner surface and a cleaning cylinder arranged in the hollow cleaning cylinder with a second cleaning surface on its cylindrical outer surface, wherein the cleaning surfaces border a cleaning gap between each other, which is greater than the cleaning gap (44) of the device subsequently used to remove impurities on the shredded plastic.

8. The method according to claim 1, characterized in that that shredded plastic to be cleaned undergoes a pre-cleaning in a pre-cleaning device before being fed between the cleaning discs (10, 40) and conveyed through the cleaning gap (44), wherein the pre-cleaning device comprises a hollow cleaning cone with a first cleaning surface on its conical inner surface and a cleaning cone arranged in the hollow cleaning cone with a second cleaning surface on its conical outer surface, wherein the cleaning surfaces border a cleaning gap between each other, which is greater than the cleaning gap (44) of the device subsequently used to remove impurities on the shredded plastic.

9. The method according to claim 5, wherein each of said cleaning ribs include an apex area, the distance between the cleaning discs (10, 40) is set such that there is a separation distance between the apex areas (26) of the cleaning ribs (18, 46) of the first cleaning surface and the apex areas (26) of the cleaning ribs (18, 46) of the second cleaning surface, which corresponds mainly with an average thickness of the shredded plastic (56) fed between the cleaning discs by means of a feeding device.

10. The method according to claim 6, wherein the cleaning gap of the pre-cleaning device is selected through adjustment of a distance between the cleaning discs such that impurities removed in the course of the pre-cleaning of the shredded plastic are not destroyed.

11. The method according to claim 7, wherein the cleaning gap of the pre-cleaning device is selected through adjustment of a distance between the hollow cleaning cylinder and the cleaning cylinder such that impurities removed in the course of the pre-cleaning of the shredded plastic are not destroyed.

12. The method according to claim 8, wherein the cleaning gap of the pre-cleaning device is selected through adjustment of a distance between the hollow cleaning cone and the cleaning cone such that impurities removed in the course of the pre-cleaning of the shredded plastic are not destroyed.

13. The method according to claim 10, wherein the removed impurities are subsequently removed from the process liquid by at least one of filtration or sifting.

* * * * *